US010460477B2

(12) United States Patent
Sharma et al.

(10) Patent No.: US 10,460,477 B2
(45) Date of Patent: Oct. 29, 2019

(54) SYSTEM AND METHOD FOR INTERACTIVELY VISUALIZING RULES AND EXCEPTIONS

(71) Applicant: Tata Consultancy Services Limited, Mumbai (IN)

(72) Inventors: Geetika Sharma, Gurgaon (IN); Gautam Shroff, Gurgaon (IN); Aditeya Pandey, Gurgaon (IN); Puneet Agarwal, Gurgaon (IN)

(73) Assignee: TATA CONSULTANCY SERVICES LIMITED, Mumbai, Maharashtra ( * ) Notice: Subject to any disclaimer, the term of this patent is extended or adjusted under 35 U.S.C. 154(b) by 29 days.

(21) Appl. No.: 14/731,756

(22) Filed: Jun. 5, 2015

(65) Prior Publication Data
US 2015/0356752 A1    Dec. 10, 2015

(30) Foreign Application Priority Data

Jun. 6, 2014    (IN) .......................... 1869/MUM/2014
Nov. 5, 2014    (IN) .......................... 1869/MUM/2014

(51) Int. Cl.
*G06T 11/00*    (2006.01)
*G06F 16/26*    (2019.01)
(Continued)

(52) U.S. Cl.
CPC ............ *G06T 11/001* (2013.01); *G06F 16/26* (2019.01); *G06T 11/206* (2013.01); *G06F 2203/04806* (2013.01); *G06N 5/025* (2013.01)

(58) Field of Classification Search
CPC ...... G06T 11/001; G06T 11/206; G06F 3/048; G06F 17/30572; G06F 8/34; G06N 5/025
See application file for complete search history.

(56) References Cited

U.S. PATENT DOCUMENTS 6,711,577 B1 * 3/2004 Wong .................. G06F 16/26
                                                   707/694
7,714,876 B1 * 5/2010 Hao .................... G06F 9/4443
                                                   345/440
(Continued)

OTHER PUBLICATIONS

Dario Bruzzese et al: "Visual Mining of Association Rules", Jul. 23, 2008, Lecture Notes in Computer Science 4404, pp. 103-122.*
(Continued)

*Primary Examiner* — Barry Drennan
*Assistant Examiner* — Khoa Vu
(74) *Attorney, Agent, or Firm* — HM Law Group LLP; Vani Moodley, Esq.

(57) ABSTRACT

The present disclosure discloses system and method for providing perceptually efficient visualization of rules and exceptions mined from dataset. Further, parsing is performed on data-attributes associated with the rules. The data-attributes may include antecedents, consequents, ranges of the antecedents, syntax and statistics of the rules and exceptions. The visualization scheme of present disclosure present an overview first, allows semantic zooming, and then shows details on demand. Further, data attributes of the rules are mapped with visual attributes of graphical elements such as shape, color, opacity to create the perceptually efficient visualization of the rules and exceptions. Initially, the visualization shows main rule highlighting the exceptions associated and properties of the exceptions. Further, a semantic zoom slider is provided for allowing a user to navigate through different exception levels of the exception. Further, an interface is provided for obtaining additional information associated with the rules and the exceptions.

15 Claims, 7 Drawing Sheets

(51) Int. Cl.
*G06T 11/20* (2006.01)
*G06N 5/02* (2006.01)

(56) References Cited

U.S. PATENT DOCUMENTS

| | | | | |
|---|---|---|---|---|
| 2009/0043714 A1* | 2/2009 | Zhao | ................... | G06F 16/2462 706/11 |
| 2010/0325588 A1* | 12/2010 | Reddy | ..................... | G06F 3/048 715/853 |
| 2011/0161886 A1* | 6/2011 | Thomson | ................... | G06F 8/34 715/853 |
| 2013/0103636 A1* | 4/2013 | Baudel | ................... | G06N 5/025 706/52 |
| 2014/0058763 A1* | 2/2014 | Zizzamia | ............... | G06Q 40/08 705/4 |
| 2014/0101591 A1 | 4/2014 | Helfman et al. | | |

OTHER PUBLICATIONS

Pak Chung Wong, Paul Whitney, Jim Thomas (Pacific Northwest National Laboratory), "Visualizing Association Rules for Text Mining", 1999, 8 pages.

* cited by examiner

Exception Level 2, Illegal Positions

Exception Level 3, Illegal Positions

Gregorian calendar: 3 Levels

SYSTEM AND METHOD FOR INTERACTIVELY VISUALIZING RULES AND EXCEPTIONS

CROSS-REFERENCE TO RELATED APPLICATIONS AND PRIORITY

The present application claims priority to Indian Provisional Patent Application No. 1869/MUM/2014, filed on Jun. 6, 2014, the entirety of which is hereby incorporated by reference.

The present application also claims priority to Complete after Indian Provisional Patent Application No. 1869/MUM/2014, filed on Nov. 5, 2014, the entirety of which is hereby incorporated by reference.

TECHNICAL FIELD

The present subject matter described herein, in general, relates to interactive visualization of rules and exceptions.

BACKGROUND

Rules along with their exceptions are generally used for explaining a large dataset associated with a survey conducted in a particular domain. Since the rules (i.e., rules set) are huge in content, identifying interesting rules amongst the rules set becomes a challenge. Due to the huge content of the rules set, multiple overlapping patterns are created which is not easy to comprehend. For comprehending the rules (rules set) and exceptions in a perceptually effective manner and communicating these to end-users, visualization of the rules and exceptions is required.

In general, the rules are implication of the form $X \rightarrow Y$, wherein X is an antecedent and Y is consequent. In one of a known visualization technique, the antecedents of the rules set are plotted against consequents in one-to-one and many-to-one relationship (i.e., $A \rightarrow C$, $B \rightarrow C$, and $A+B \rightarrow C$). The one-to-one and many-to-one mappings are visualized in the form of a matrix. Unfortunately, when the number of antecedents and consequents increases in the given rules set, the visualization of antecedent-to-consequent mapping on the visualization becomes unwieldy and difficult to understand for end-users.

Further, the one-to-one and the many-to-one mappings may also be shown in a three-dimensional (3D) landscape. In the 3D landscape, more important rules are placed in foreground and less important rules are placed in background. Further, each rule of the rules set is shown as a sphere whose area represents support, and a cone whose height represents confidence. However, the use of 3D representation for visualizing the rules set creates another issue of occlusion. The occlusion results in hiding of data points on the 3D interface when seen at a certain viewing angle. Also, the 3D interface becomes quite complex and is harder to understand/learn for the end-users. Further, perspective projection also distorts sizes of the objects of the 3D interface. Thus, in the above discussed visualization techniques, a common issue of perceptually visualizing the huge content of the rules set is lacking.

SUMMARY

This summary is provided to introduce aspects related to systems and methods for visualizing rules and one or more exceptions and the concepts are further described below in the detailed description. This summary is not intended to identify essential features of subject matter nor is it intended for use in determining or limiting the scope of the subject matter.

In one implementation, a system for visualizing a rule and one or more exceptions for the rule is disclosed. Further, the rule and the one or more exceptions are derived from a dataset. The system comprises a processor and a memory coupled to the processor for executing a plurality of modules stored in the memory. The plurality of modules comprises a receiving module, a visualizing module, a parsing module, a color assignment module, and a user-interface module. The receiving module receives the rule, the one or more exceptions for the rule, and a plurality of data-attributes associated with the rule and the one or more exceptions. Further, the plurality of data-attributes comprises a list of antecedents, a list of consequents, a rule syntax, an exception syntax, a support associated with the rule, a confidence associated with the rule, a support associated with each exception of the one or more exceptions, and a confidence associated with each exception of the one or more exceptions. The support associated with the rule, the confidence associated with the rule, the support associated with each exception, and the confidence associated with each exception are statistics associated with the rule and each exception respectively. Further, the visualization module visualizes the rule and the one or more exceptions by representing the rule and the one or more exceptions with a first graphical element and a plurality of second graphical elements respectively. Further, the plurality of second graphical elements is represented within the first graphical element. Further, the first graphical element and the plurality of second graphical elements have a plurality of visual attributes comprising a shape, a size, a transparency, a color opacity and a color. Further, the plurality of data-attributes are mapped with the plurality of visual attributes. Further, the size of the first graphical element and the plurality of second graphical elements are proportional to the support of the rule and the support of the exceptions respectively. Further, the color opacity of the first graphical element and the plurality of second graphical elements are mapped with the confidence of the rule and the confidence associated with each exception of the one or more exceptions respectively. Further, each of the plurality of second graphical elements is segmented into a plurality of sections indicating a plurality of antecedents forming the exception, wherein at least one section of a second graphical element and at least one section of other second graphical element have similar antecedents, and wherein the at least one section of the second graphical element and the at least one section of the other second graphical element is connected via an edge. The visualization module during the visualization of a plurality of rules and the one or more exceptions minimizes an overlap between the plurality of rules by identifying one or more cliques between nodes associated with the plurality of rules, and positioning the nodes accordingly.

In another implementation, a method for visualizing a rule and one or more exceptions for the rule is disclosed. Further, the rule and the one or more exceptions are derived from a dataset. The method may comprise receiving, by a processor, the rule, the one or more exceptions for the rule, and a plurality of data-attributes associated with the rule and the one or more exceptions. Further, the plurality of data-attributes comprises a list of antecedents, a list of consequents, a rule syntax, an exception syntax, a support associated with the rule, a confidence associated with the rule, a support associated with each exception of the one or more exceptions, and a confidence associated with each exception of the one or more exceptions. The support associated with the rule, the confidence associated with the rule, the support associated with each exception, and the confidence associated with each exception are statistics associated with the rule and each exception respectively. The method further comprises a step of visualizing, by the processor, the rule and the one or more exceptions. The visualization of the rule and the one or more exceptions may be performed by representing the rule and the one or more exceptions with a first graphical element and a plurality of second graphical elements respectively. Further, the plurality of second graphical elements is represented within the first graphical element. Further, the first graphical element and the plurality of second graphical elements have a plurality of visual attributes comprising a shape, a size, a color opacity, and a color. Further, the plurality of data-attributes are mapped with the plurality of visual attributes. Further, the size of the first graphical element and the plurality of second graphical elements are proportional to the support of the rule and the support of the one or more exceptions respectively. Further, the color opacity of the first graphical element and the plurality of second graphical elements are mapped with the confidence of the rule and the confidence associated with each exception of the one or more exceptions respectively. Further, each of the plurality of second graphical elements is segmented into a plurality of sections indicating a plurality of antecedents forming the exception, wherein at least one section of a second graphical element and at least one section of other second graphical element have similar antecedents, and wherein the at least one section of the second graphical element and the at least one section of the other second graphical element is connected via an edge. The method further comprising visualization of a plurality of rules and the one or more exceptions minimizes an overlap between the plurality of rules by identifying one or more cliques between nodes associated with the plurality of rules, and positioning the nodes accordingly.

Yet in another implementation a non-transitory computer readable medium embodying a program executable in a computing device for visualizing a rule and one or more exceptions for the rule is disclosed. Further, the rule and the one or more exceptions of the rule are derived from a dataset. The program comprising a program code for receiving the rule, the one or more exceptions, and a plurality of data-attributes associated with the rule and the one or more exceptions. Further, the plurality of data-attributes comprises a list of antecedents, a list of consequents, a rule syntax, an exception syntax, a support associated with the rule, a confidence associated with the rule, a support associated with each exception of the one or more exceptions, and a confidence associated with each exception of the one or more exceptions. The support associated with the rule, the confidence associated with the rule, the support associated with each exception, and the confidence associated with each exception are statistics associated with the rule and each exception respectively. The program further comprises a program code for visualizing the rule and the one or more exception by representing the rule and the one or more exceptions with a first graphical element and a plurality of second graphical elements respectively in such a manner that the plurality of second graphical elements are represented within the first graphical element. Further, the first graphical element and the plurality of second graphical elements have a plurality of visual attributes comprising a shape, a size, a transparency, a color opacity, and a color. Further, the plurality of data-attributes are mapped with the plurality of visual attributes. Further, the size of the first graphical element and the plurality of second graphical elements are proportional to the support of the rule and the support of the one or more exceptions respectively. Further, the color opacity of the first graphical element and the plurality of second graphical elements are mapped with the confidence of the rule and the confidence associated with each exception of the one or more exceptions respectively. Further, each of the plurality of second graphical elements is segmented into a plurality of sections indicating a plurality of antecedents forming the exception, wherein at least one section of a second graphical element and at least one section of other second graphical element have similar antecedents, and wherein the at least one section of the second graphical element and the at least one section of the other second graphical element is connected via an edge.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
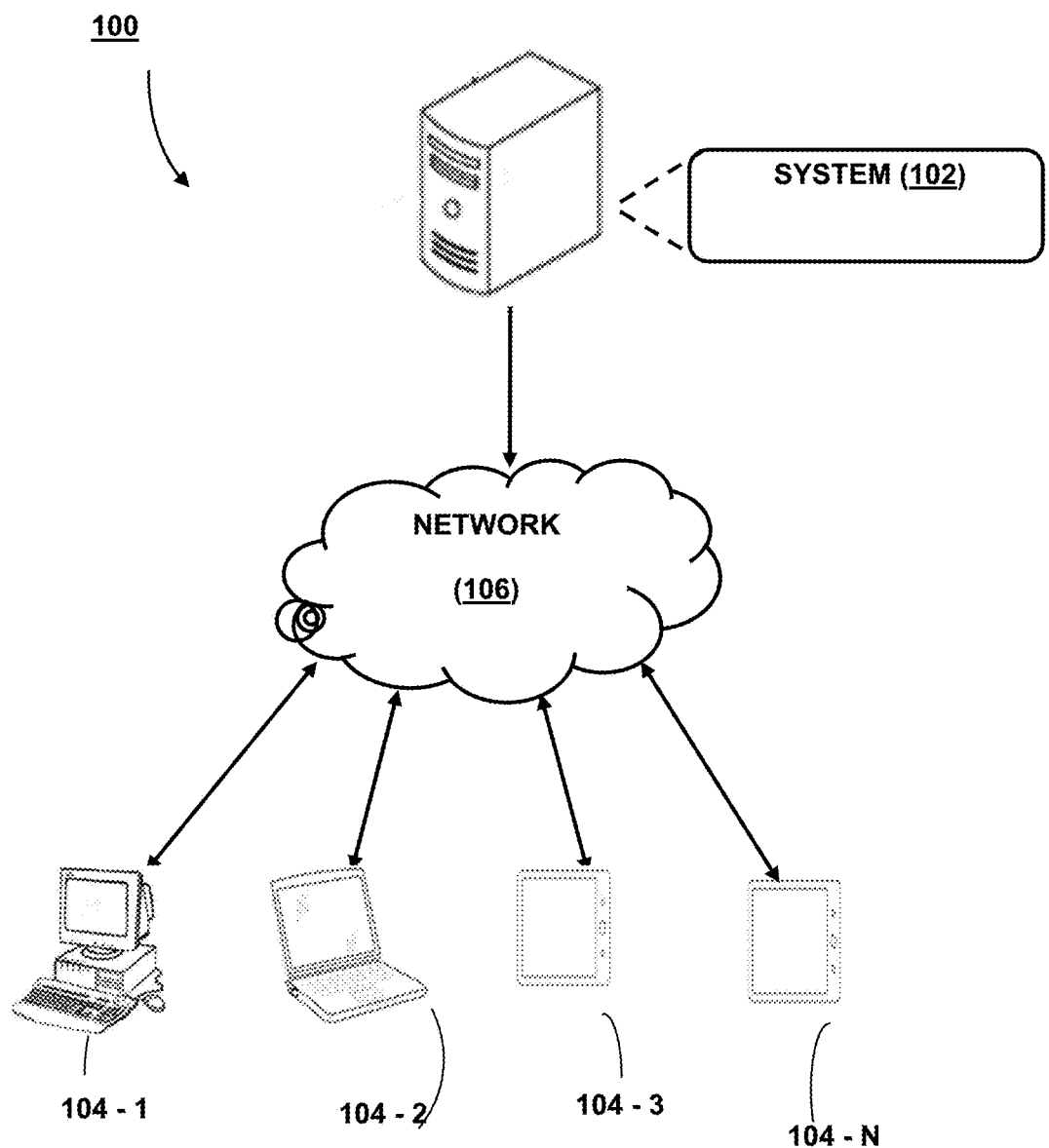
FIG. 1 illustrates a network implementation of a system for providing interactive visualization of rule and exceptions for the rule, in accordance with an embodiment of the present subject matter.

Systems and methods for visualizing a rule and one or more exceptions for the rule are described. The present disclosure provides interactive visualization of the rule and the one or more exceptions associated with the rule. In general, the rule along with their exceptions is generally used to explain large data sets in a comprehensible manner. The large data set may belong to a survey conducted in a particular domain. Further, the rules and their exceptions are extracted from these large data sets by using data mining techniques. The rules may be defined as an implication $X \rightarrow Y$, where X and Y are unique attributes of the large data set if X and Y occur together in a large number of transactions. Further, X and Y may be called as antecedent and consequent of the rules respectively. Further, a support and confidence are statistics associated with the rules extracted from the large data set. The support of the rule is a proportion of records in which the rule occurs, whereas, the confidence of the rule $X \rightarrow Y$ is a ratio of number of records in which X and Y both occur and number of records in which only X appears. Further, the confidence may range from 0 when X and Y never occur together, to 1 when X and Y always occur together. Further, a ratio of the confidence and the support of the consequent are called a lift of the rule, and the lift of the rule indicates interestingness of the rule. In one aspect of present disclosure, the rules with lifts differing significantly from 1 are considered as more interesting (or unexpected) than those with near unit lift.

The rules, extracted from the large data set, may be huge in content. To simplify the representation of these rules along with their exceptions, visualization of the rules may be required. The simplification of the rules through the visualizations helps in identifying or discovering important rules from the rules extracted from the large data set. The visualization scheme disclosed according to the present disclosure present an overview first, allows semantic zooming, and then shows details on demand using principles of the visualization scheme. According to the visualization scheme disclosed in present disclosure, the rules may be represented as a circle, and radius of the circle may be mapped to the support of the rule. Further, the confidence of the rule may be mapped to the fill color opacity of the circles. The visualization scheme also provides a text box above the circle, wherein the text box displays syntax of the rule and its statistics such as the support and the confidence. According to embodiments of present disclosure, the rules and the one or more exceptions may also be represented by different types of shapes such as square, rectangle, triangle, diamond shape, rhombus, oval shape, or other possible shapes other than the circle. It may be further noted, that the attributes/properties (such as size, color, transparency, opaqueness etc) of the different types of shapes may signify various aspects of data-attributes associated with the rule and the exceptions.

Further, the one or more exceptions associated with the rules may also be represented using same visual encoding used for visualizing the rules. According to an aspect of the present disclosure, the visual encoding representing the exceptions (i.e., exception circle) are contained within visual encoding representing the rule or main rule (i.e., rule circle). The rule circle representing the rule may contain plurality of exception circles representing the exceptions associated with the rule. The exception circles may provide two levels of drill down. At a first level, the exception circles have a fill color contrasting that of the main rule. Further, it may be understood that representation of the confidence by fill color opacity may be motivated by a fact that the exceptions with higher confidence will have a stronger visual presence as they are more opaque than those with lower confidence. This way, the visualization scheme provides better representation of the rule and their exceptions based on the different levels of color opacity. Further, the visualization scheme of the present disclosure provides a semantic zoom slider when moved to a second level, the first level of the exceptions come in focus. According to an aspect of present disclosure, the exception circles transits into a pie with equally sized slices representing the antecedents. The equally sized slices representing the antecedents further form the exception of the rule. Further, when a user hover a mouse over the exception circle, a text box may be popped-up having syntax and statistics. Further, a value of the antecedent may be in a numerical range which may be shown by a horizontal bar filled up at an appropriate range interval. Further, the present disclosure also configured for minimizing edge crossing representing overlap between the rules. The edge crossing may be minimized by identifying cliques between nodes and positioning them appropriately during the visualization of the rules and their exceptions. Thus, the visualization scheme of the present disclosure provides a perceptually efficient visualization. According to other embodiments of present disclosure, the visualization scheme disclosed may also be used to visualize different types of hierarchical data other than the rule and exceptions.

While aspects of described system and method for visualizing the rule and the exceptions may be implemented in any number of different computing systems, environments, and/or configurations, the embodiments are described in the context of the following exemplary system.

Referring to FIG. 1, a network implementation 100 of a system 102 for providing visualization of the rule and the exceptions for the rule is illustrated, in accordance with an embodiment of the present subject matter. In one embodiment, the system 102 facilitates perceptually efficient visualization of the rules and their exceptions. Although the present subject matter is explained considering that the system 102 is implemented as a computing system, it may be understood that the system 102 may also be implemented as a variety of computing systems, such as a laptop computer, a desktop computer, a notebook, a workstation, a mainframe computer, a server, a network server, a tablet, a mobile phone, and the like. In one implementation, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
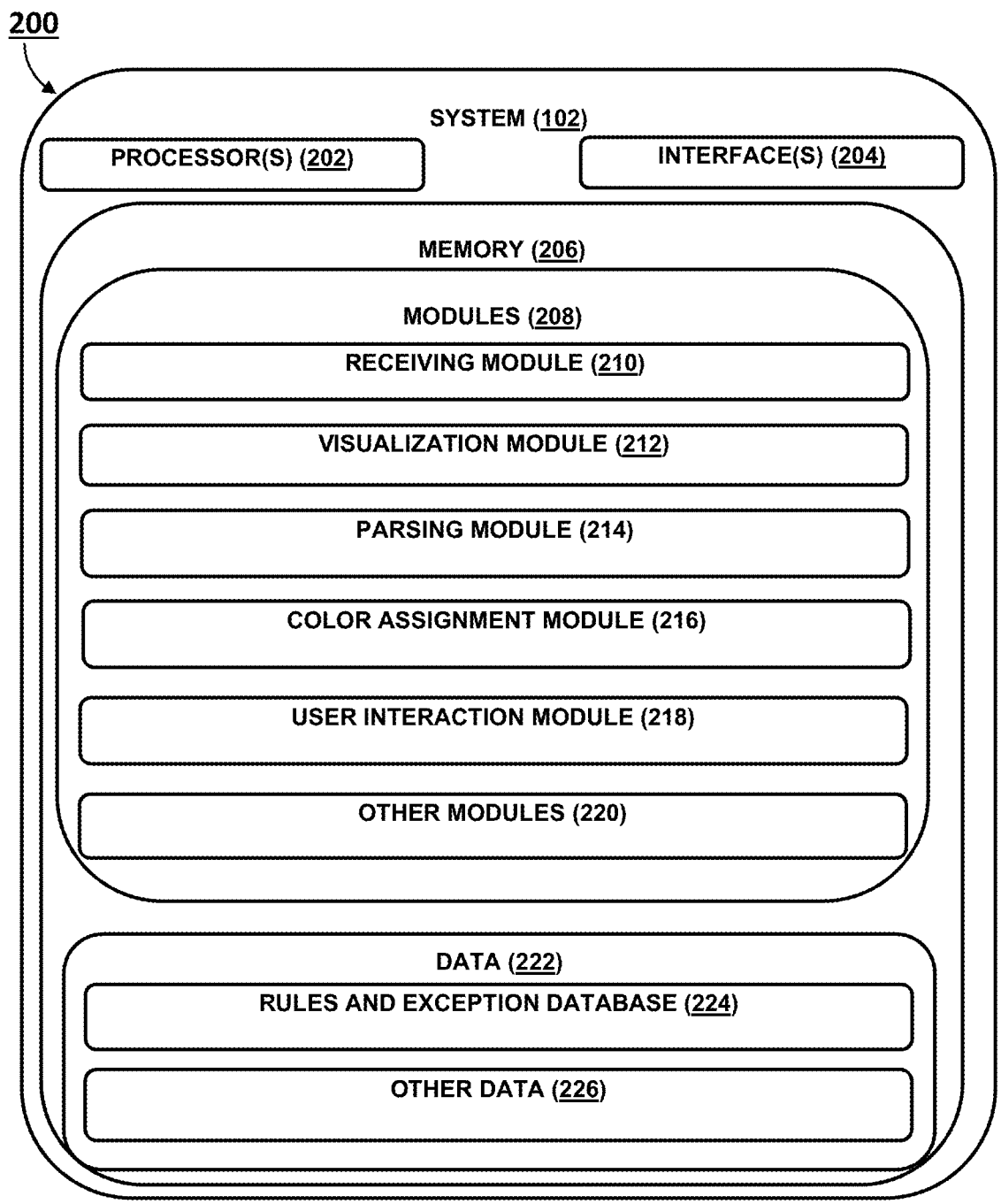
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 222.

The modules 208 include routines, programs, objects, components, data structures, etc., which perform particular tasks or implement particular abstract data types. In one implementation, the modules 208 may include a receiving module 210, a visualization module 212, a parsing module 214, a color assignment module 216, a user interaction module 218, and other modules 220. The other modules 220 may include programs or coded instructions that supplement applications and functions of the system 102.

The data 222, amongst other things, serves as a repository for storing data processed, received, and generated by one or more of the modules 208. The data 222 may also include rules and exception database 224, and other data 226.

Figure 3:
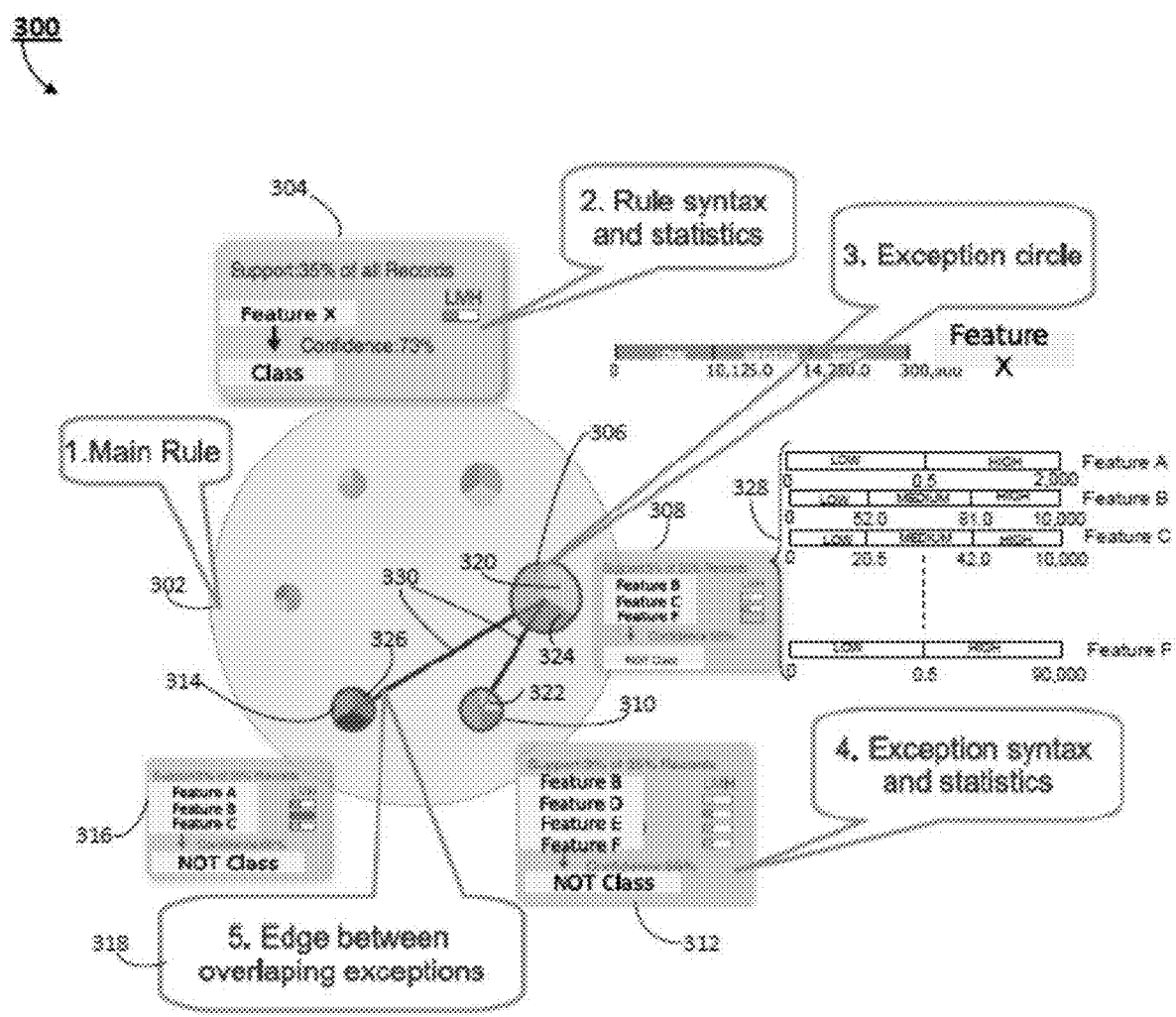
FIGS. 3, 3A, 3B, and 3C illustrates an example illustrating a visualization scheme for the rule and exceptions for the rule in detail, in accordance with an embodiment of the present subject matter.

Referring now to FIG. 3 is an example illustrating visualization of the rule and the exceptions of the rule, in detail implemented by the system 102, in accordance with an embodiment of the present subject matter. The present disclosure relates to the visualization scheme for providing interactive visualization of the rule along with their exceptions. In general, the rule and the exceptions of the rule are extracted from the large data set using different data mining techniques. The large data set may be associated with a survey conducted in a particular domain. Further, the rule and the exceptions are generally used to explain the large data sets in a comprehensible manner. For comprehending the rule and the exceptions and effectively communicating it to end users, a perceptually efficient visualization may be required.

But, before creating the visualization of the rules and exceptions, the parsing module 214 of the system 102 parses plurality of data-attributes associated with the rule and the exceptions extracted from the large data set. The plurality of data-attributes may comprise a list of antecedents, a list of consequents, ranges of the antecedents, a syntax of the rules and exceptions (i.e., rule syntax and exception syntax), and statistics of the rules and exceptions. The rules may be defined as an implication X→Y, where X and Y are unique attributes of the large data set if X and Y occur together in a large number of transactions. Further, X and Y are antecedents and consequents of the rule respectively. Further, the statistics associated with the rule comprises support of the rule and confidence of the rule. The support of the rule is a proportion of records in which the rule occurs, whereas, the confidence of the rule X→Y is a ratio of number of records in which X and Y both occur and number of records in which X appears. The confidence of the rule may range from 0 when X and Y never occur together, to 1 when X and Y always occur together. Further, another data-attribute associated with the rule is a lift i.e., a ratio of the confidence and the support of the consequent, whereas the lift indicates an interestingness of the rule. In one aspect of present disclosure, the rules with lifts differing significantly from 1 are considered as more interesting (or unexpected) than those with near unit lift.

According to embodiments of present disclosure, the receiving module 210 of the system 102 may receive the rule, the exceptions of the rule, and the plurality of data-attributes (parsed by the parsing module 214) as an input for providing visualization of the rule and the exceptions. The rule along with their exception, extracted from the large data set, may be huge in content. To simplify this huge content of the rules, visualization is required. Simplifying the rules through the visualization helps in identifying or discovering important rules from the rules extracted from the large data set. Further, the rules along with their exceptions may be stored in rules and exception database 224 of the system 102.

For providing visualization, the visualization module 212 of the system 102 visualizes the rule and the exceptions by representing the rule and the exceptions with a first graphical element and a plurality of second graphical elements respectively. According to embodiments of present disclosure, the first graphical element and the plurality of second graphical elements may be represented by same or different shape. According to the present example, the first graphical element and the plurality of second graphical elements are represented by circle. Further, the visualization is provided in such a manner that the plurality of second graphical elements is represented within the first graphical element. Also, the first graphical element and the plurality of second graphical elements have a plurality of visual attributes comprising a shape, a size and a color.

According to embodiments of present disclosure, the visualization scheme provides mapping of the plurality of data-attributes with visual attributes for creating the visualization. Further, the plurality of data-attributes i.e., the list of antecedents, the list of consequents, the support associated with the rule, the confidence associated with the rule, support associated with each exception, confidence associated with each exception, the rule syntax, and the exception syntax, may be abstracted into different categories like nominal, ordered and quantitative. Further, the plurality of data attributes may be mapped with the visual attributes like position, size, color, texture, intensity, and on the like. In one example, if the data attribute is categorized in the nominal category, then it may be well represented by the visual attributes like color, shape, and texture. In another example, if the data attribute is categorized in the quantitative category, then it may be well represented by the visual attributes like length, position, area, angle, and volume.

Further, the visualization module 212 of the system 102 creates the visualization of the rule and their exceptions by mapping the plurality of data attributes with graphical elements (first and second graphical element). The visualization module 212 also computes positioning of the graphical elements for providing the visualization of the rule and their exceptions. After computing the positioning of the graphical elements, the visualization module 212 may be configured for drawing the visualization of the rules and their exceptions (as shown in FIG. 3). Further, layout of the visualization generated/drawn may also be used for visualizing rule hierarchies as well as general rules and the exceptions. The user interaction module 218 of the system 102 manages interaction of the user with the visualization generated for the rule and their exceptions. Based on the user action during the interaction, the visualization module 212 of the system 102 may be further configured to update the visualization generated accordingly.

In the present example, the rule and the exceptions for the rules are represented by the circle (i.e., the graphical element). As it can be seen from FIG. 3, a circle 302 is shown which represents a main rule. Further, the circle 302 comprises smaller circles (306, 310, and 314) representing various exceptions of the main rule. Thus, the circle 302 (representing the main rule) is considered as the first graphical element and the smaller circles 306, 310, 314 (representing the various exceptions) are considered to be plurality of second graphical elements. With every circle (rule circle and exception circle), a text box may be associated for displaying the data-attributes (i.e., rule syntax, exception syntax, and statistics) of the rule and the exceptions. For example, a text box 304 associated with the circle 302 of the main rule is displayed on the visualization. The text box 304 generated displays the rule syntax and the statistics associated with the main rule's circle 302. The rule syntax of the main rule comprises antecedent (i.e., Feature X) and consequent (i.e., Class). Further, the statistics of the main rule comprises support (i.e., 35% of all records) and confidence (i.e., 73%). Further, the support of the main rule is proportional to radius of the circle 302 representing the main rule. That is, the radius of the circle increases with the increase in the support associated with the rule. Since, the support is the portion of the data set for which the rule holds and radius controls the area of the circle i.e., larger the support, larger the circle. Further, the confidence of the main rule (i.e., represented by the circle 302) may be mapped with the circle 302 fill color opacity.

After generating the circle 302 for the main rule, exceptions associated with the main rule is also generated using similar visual encoding (i.e., circle) used for representing the main rule. Further, it may be noted that the size of the first graphical element (circle 302) and the plurality of second graphical elements (306, 310, and 314) are proportional to the support of the rule and the support of the exceptions respectively. Also, the color opacity of the first graphical element (circle 302) and the plurality of second graphical elements (306, 310 and 314) are mapped with the confidence of the main rule. In the present example, three exceptions are represented by the circles i.e., 306, 310, and 314 within the circle 302 of the main rule. In one example, a text box 308 can be seen from FIG. 3, associated with the circle 306 representing the exception of the main rule. The text box 308 generated displays the exception syntax and the statistics associated with the exception represented by the circle 306. The exception syntax comprises antecedents (i.e., Feature B, Feature C, and Feature F), and consequent (i.e., NOT Class). Further, the statistics comprises the support (i.e., 5% of 35% records) and the confidence (56%).

Another text box 312 is displayed corresponding to the circle 310 representing another exception associated with the main rule. The text box generated displays the exception syntax and the statistics associated with the exception (i.e., represented by the circle 310). The exception syntax comprises antecedents (i.e., Feature B, Feature D, Feature E, and Feature F) and consequent (i.e., NOT Class). Further, the statistics comprises the support (i.e., 3% of 35% records) and the confidence (56%).

Yet another text box 316 is generated corresponding to the circle 314 representing another exception associated with the main rule. The text box 316 generated displays the exception syntax and the statistics associated with the exception represented by the circle 314. The exception syntax comprises the antecedents (i.e., Feature A, Feature B, and Feature C) and the consequent (NOT Class). Further, the statistics comprises support (3% of 35% records) and confidence (66%).

Further, all the three circles (306, 310, and 314) representing the exceptions of the main rule are contained within the circle 302. The circles (306, 310, and 314) may also be referred as "exception circles". Further, the exception circle at first level have a fill color contrasting that of the main rule. Further, the representation of the confidence, for each exception, by fill color opacity may be motivated by a fact that exceptions with higher confidence will have a stronger visual presence as they are more opaque than those with lower confidence. Further, a next level of exceptions implies the consequent of the main rule i.e., exceptions to exceptions. The next level of exceptions can also be visualized using same visual encoding recursively but having the same fill color as the main rule.

According to embodiments of present disclosure, when a semantic zoom slider is moved to a next level of exceptions, the first level of exceptions comes in focus. Thus, the semantic zoom slider provides semantic zooming from the first level of exception to subsequent levels of exceptions associated with the rule. Further, the exception circles transition into a pie with equally sized slices representing the antecedents thereby visually indicating the number of antecedents that make up the exception. For example, the exception circle 306 transitions into pie with 3 equally sized slices representing the antecedents (i.e., Feature B, Feature C, and Feature F). Further, the color assignment module 216 of the system 102 assigns color to each of the antecedents of the rule. The color is assigned in such a manner that the antecedents belonging to same category is assigned same hue or shade but different saturation levels, whereas, the antecedents not belonging to the same category are assigned with different color using a color scale. Further, by hovering the mouse over the exception circles i.e., 306, 310, and 314 brings up the text box 308, 312, and 316 respectively (as discussed earlier) with their corresponding exception syntax and statistics. Further, the value of an antecedent may lie in a numerical range as shown as a horizontal bar 328 filled up with appropriate range interval (divided into three levels, viz. High, Medium, and Low).

It can be further observed from the FIG. 3 that the exception circles 310 and 314 shares antecedents present in the exception circle 306. For example, the antecedent 320 of the exception circle 306 is also shared as the antecedent 322 of the exception circle 310. In another example, the antecedent 324 of the exception circle 306 is also shared as the antecedent 326 of the exception circle 314. The shared antecedents can be easily identified by same color in different pies. Further, the overlap of the antecedents may be represented by a line 330 connecting the exception circles (306, 310, and 314). According to embodiments, the width of the line/edge 330 represents the degree of overlap of the antecedents. It may be noted to a person skilled in art, that the rules and the exceptions may also be represented by different types of shapes such as square, rectangle, triangle, diamond shape, rhombus, oval shape, or other possible shapes other than the circle. It may be further noted, that the attributes/properties (such as size, color, transparency, opaqueness etc) of the different types of shapes may signify various aspects of metadata associated with the rules and exceptions. This way, the system 102 provides an improved visualization of the rule and the exceptions helping the users in taking decisions.

According to embodiments of present disclosure, the visualization may be provided for rule sets derived from literatures or from real-world data. In one example, the rules and exception as shown in FIG. 3 may be considered to be mined from the data of the real world survey for a product with 6443 row of records. Further, different techniques may be used which may reduce 177,094 rules mined to 3 high level rules with multiple exceptions. This set of rules and exceptions illustrates the complexity that can arise in the real-world data.

To overcome such situation, visualization is done for the rules and the exceptions. In one aspect of present disclosure, the visualization may be presented to an end-user who may be a product engineer. Due to the visualization generated, the multitude of the rules may be whittled down to few interesting rules amongst the rule set. Further, the appearance of exceptions as "holes" or circles within the main rule displays the significance and intuitive semantics. Also, a self-controlled pace at which the end-user could obtain information about the exceptions made relationships between antecedents more apparent.

Figure 3A:
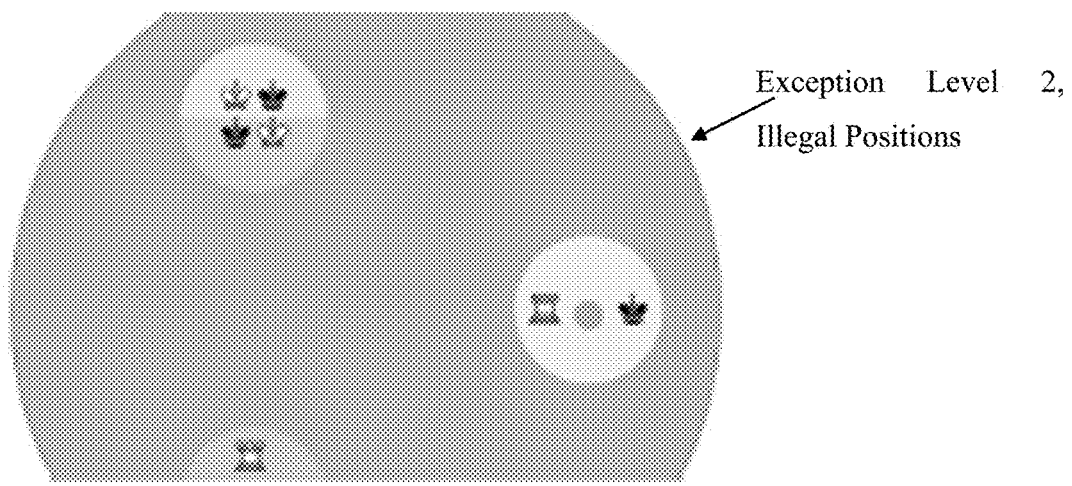
Figure 3A:
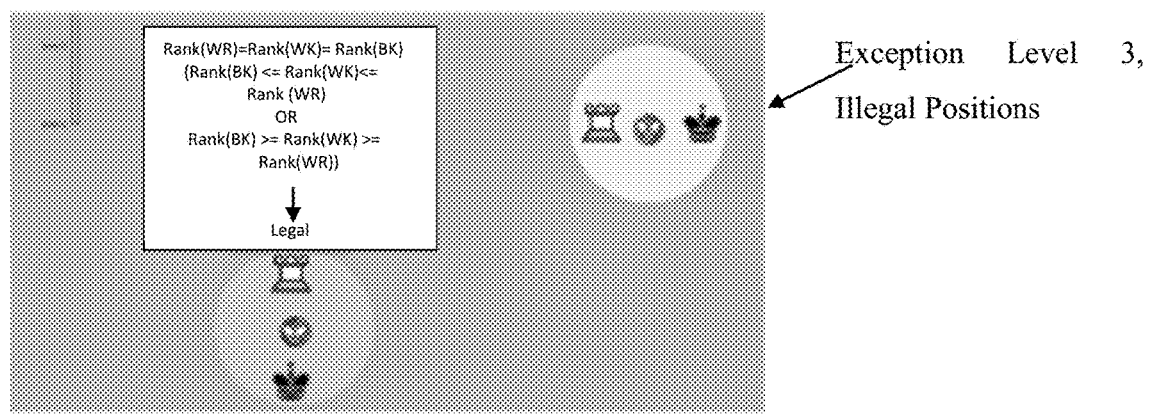

In another example as shown in FIG. 3A, a next rule set considered to be visualized may be taken from well-known "King-Rook-King" chess endgame having two levels of exception. In this present example, the rule set describes which positions of White King, White Rook, and Black King are illegal when White has to move next. A position is called illegal if it cannot be reached as the Black King would have been mated in the previous move. Further, a main rule corresponding to this example may say that all positions are legal, except when the White Rook and Black King are in a (1) horizontal or (2) vertical line or (3) when the two kings are adjacent. Exceptions to the rules (1) and (2) occur when the White King is between the White Rook and Black King, so the Black King is not threatened by the White Rook. Further, the exceptions level 2 and 3 are shown below in the FIG. 3A. Thus, it may be observed that the number of exception levels and the number of exceptions at a level are apparent from the above visualization.

Figure 3B:
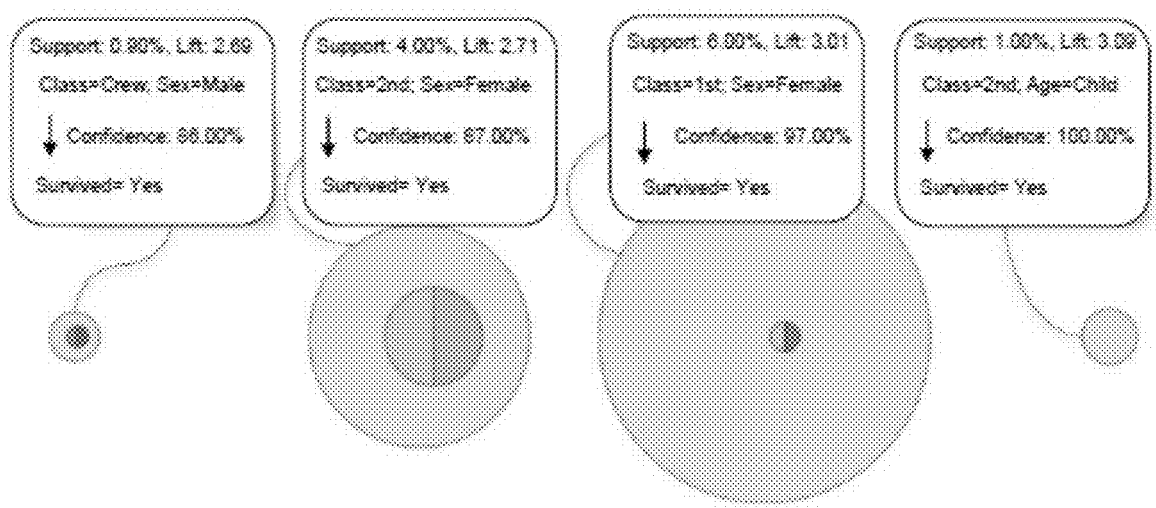

Yet, in another example as shown in FIG. 3B, a titanic data may be considered, wherein rule set of the titanic data consist of association rules mined from survival data set of passengers on the Titanic. In this example, there are two sets of rules associating the class, gender, and age of passengers with whether they survived or not. Each set has multiple rules may imply the same consequent. According to this example, a sample rule may be: Class=1 & Sex=Female→Survived=Yes. Further, Support=0.18% and Confidence=97%. According to this example, a multiple top-level titanic rules is shown in the FIG. 3B for same consequent (i.e., survived) ordered by lift.

Figure 3C:
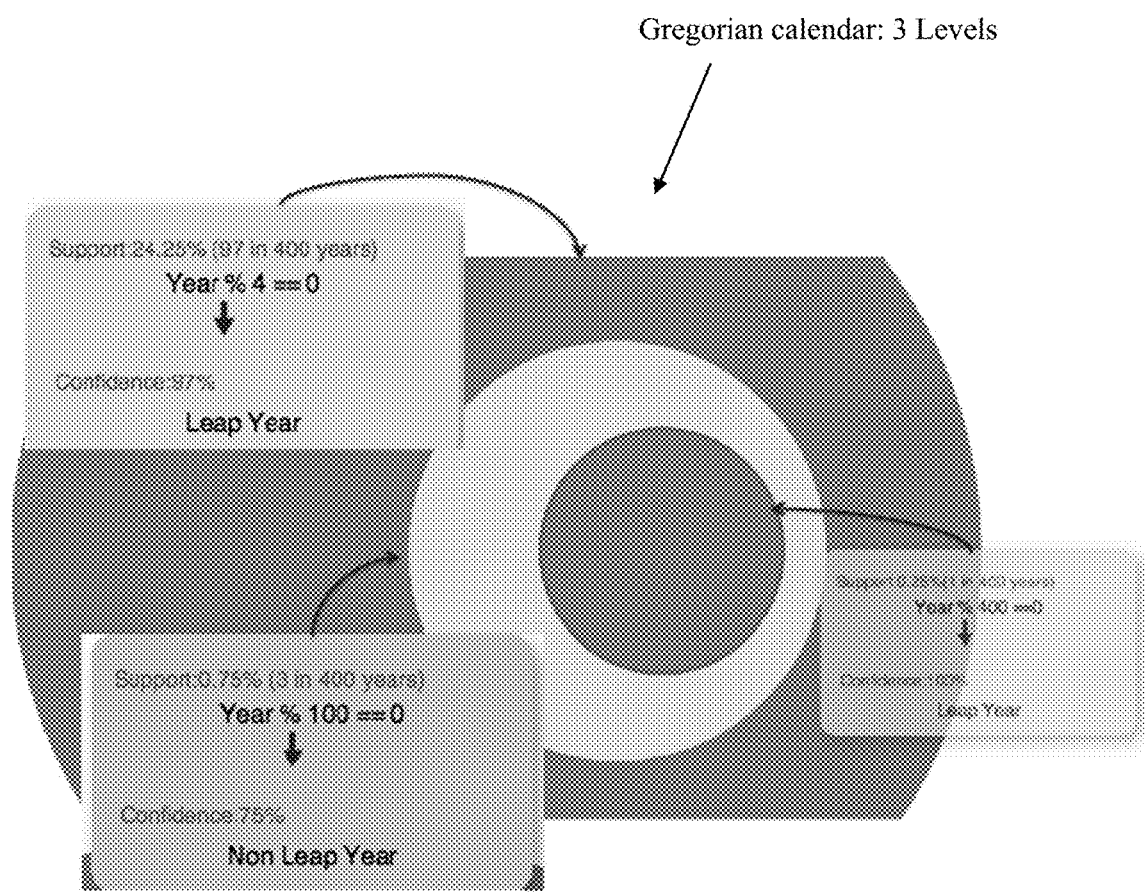

Yet, in another example as shown in FIG. 3C, a "Gregorian calendar" may be considered. Further, the visualization scheme may be implemented to visualize the rules of the Gregorian calendar for deciding leap years having 2 levels of exceptions. Further, the support and confidence for each rule is based upon the occurrence of the leap year in a span of 400 years. Since, the difference in supports of the rules is large, a log scale may be applied on the support to compute radii of the circles. Further, 3 levels of visualization is shown in FIG. 3C as shown below. Thus, number of exception levels and their frequency of occurrence are clearly evident from the below visualization as shown in the FIG. 3C.

Thus, from above the discussions and examples, it may be evident that the present disclosure has proposed an interactive layout for visualizing the rules and their exceptions with the goal of making insights from large data set easier to comprehend and communicate to the end-users. Further, enhancements may be done in the disclosed subject matter regarding exceptions circles being ordered based on some interestingness measure. Also, the assignments of colors to the antecedents may be used to indicate a property of the data set. For example, similar antecedents could be represented by the same hue or shade but different saturation levels to bring out categories of antecedents in the data set. Further, the present disclosure may also intend to explore an approach to connect rule semantics and visual display, including modeling domain-specific depictions as in the chess example as discussed above.

Figure 4:
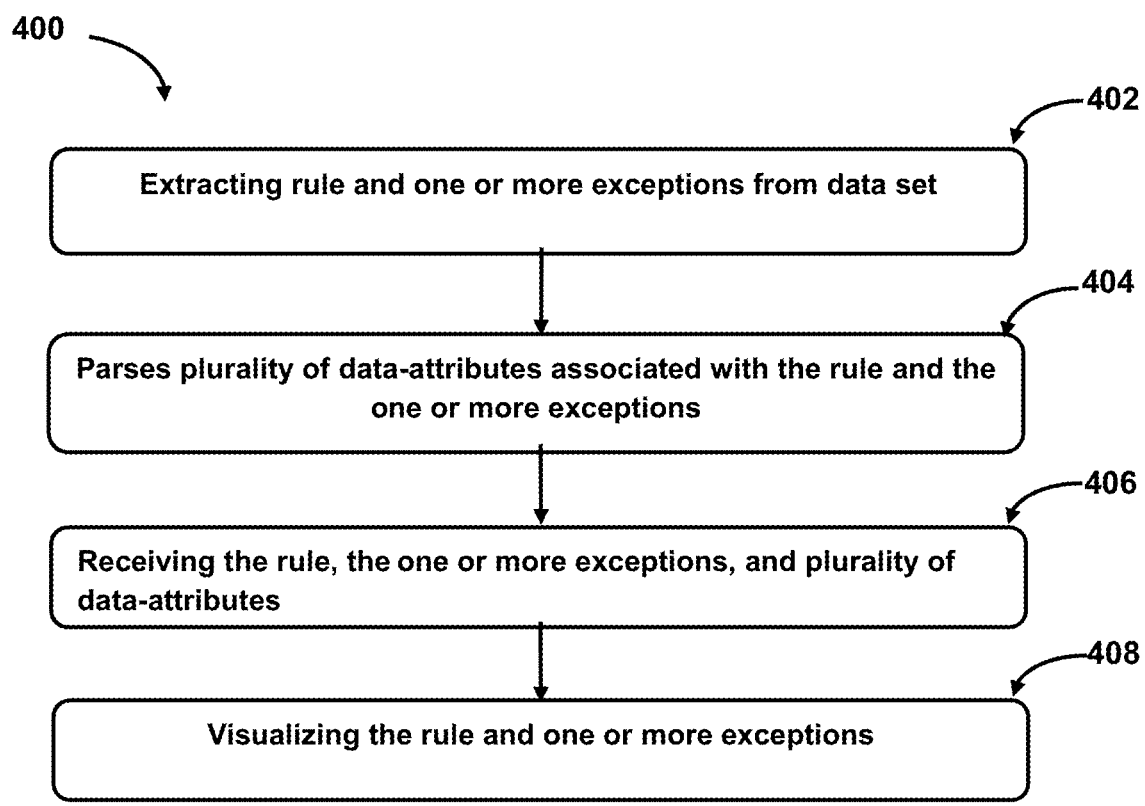
FIG. 4 illustrates a method for providing interactive visualization of the rule and exceptions for the rule, in accordance with an embodiment of the present subject matter.

Referring now to FIG. 4, a method 400 for providing visualization of rule and one or more exceptions is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, a rule and the one or more exceptions may be extracted from a data set. Generally, the rule along with their exceptions is used to explain the data sets in a comprehensible manner.

At block 404, a plurality of data-attributes associated with the rule and one or more exceptions are parsed. Further, the plurality of data-attributes may comprise a list of antecedents, a list of consequents, ranges of the antecedents, a syntax of the rules and exceptions (i.e., rule syntax and exception syntax), and a statistics (support and confidence) of the rules and exceptions.

At block 406, the rule, one or more exceptions for the rule, and the plurality of data-attributes may be received as an input for providing the visualization.

At block 408, the visualization of the rule and their exceptions are generated by representing the rule and the exceptions with a first graphical element and a plurality of second graphical elements respectively. Further, the visualization is generated in a manner that the plurality of second graphical elements is represented within the first graphical element. Further, the plurality of data attributes (such as support, confidence etc.,) associated with the rule may be mapped with visual attributes of the graphical elements that make up the visualization of the rules and the one or more exceptions. Also, the positioning of the graphical elements (first and second graphical element) is also computed for generating the visualization of the rules and one or more exceptions.

Although implementations for methods and systems for visualizing the rules and one or more exceptions have been described in language specific to structural features and/or methods, it is to be understood that the appended claims are not necessarily limited to the specific features or methods described. Rather, the specific features and methods are disclosed as examples of implementations for providing visualization of the rules and the exceptions extracted from the data set.

The invention claimed is:

1. A method for visualizing a rule and one or more exceptions for the rule, wherein the rule and the one or more exceptions are derived from a data set, and wherein the method comprises:

receiving, by a processor, the rule, the one or more exceptions, and a plurality of data attributes associated with the rule and the one or more exceptions, wherein the plurality of data-attributes comprises a list of antecedents, a list of consequents, a rule syntax, an exception syntax, a support associated with the rule, a confidence associated with the rule, a support associated with each exception of the one or more exceptions, a lift, and a confidence associated with each exception of the one or more exceptions, wherein the lift corresponds to a ratio of the confidence and the support of the consequent, wherein the rules with lift differ significantly from unit lift is considered unexpected than those with near unit lift, and wherein the support associated with the rule, the confidence associated with the rule, the support associated with each exception, and the confidence associated with each exception are statistics associated with the rule and each exception respectively; and visualizing, by the processor, the rule, and the one or more exceptions by:

representing the rule and the one or more exceptions with a first graphical element and a plurality of second graphical elements respectively, wherein the plurality of second graphical elements are represented within the first graphical element, and wherein the first graphical element and the plurality of second graphical elements have a plurality of visual attributes comprising a shape, a size, a transparency, a color opacity and a color;

mapping, by the processor, the plurality of data-attributes with the plurality of visual attributes, wherein the color opacity of the first graphical element and the plurality of second graphical elements is mapped with the confidence associated with the rule and the confidence associated with each exception of the one or more exceptions, wherein the plurality of data-attributes are categorized as nominal and quantitative, wherein if the data-attribute is in nominal category, then the data-attribute is represented by visual attribute of color, shape and texture, wherein if the data-attribute is in quantitative category, then the data-attribute is represented by visual attribute of length, position, area, angle, and volume;

computing, by the processor, positioning of the first graphical element and the plurality of second graphical elements, wherein the size of the first graphical element and the plurality of second graphical elements are proportional to the support associated with the rule and the support associated with each exception of the one or more exceptions;

generating visualization of the rules and the support associated with each exception of the one or more exceptions based on the computed positioning, wherein the visualization generated is used for developing rule hierarchies and updating the visualization based on user interaction; and connecting at least one section of a second graphical element with at least one section of other second graphical element by an edge, wherein the at least one section of the second graphical element and the at least one section of the other second graphical element is connected based on having similar antecedents, and wherein a width of the edge represents a degree of overlap of the antecedents, wherein the one or more exceptions associated with the rules are represented using visual encoding that is used for visualizing the rules, and the visual encoding representing the exceptions are contained within the visual encoding representing the rules.

2. The method of claim 1, further comprising providing a semantic zooming from a first level of exception to subsequent levels of exceptions of the rule using a semantic zoom slider.

3. The method of claim 1, further comprising displaying the first graphical element and the plurality of second graphical element in visually distinguishing manner.

4. The method of claim 1, wherein the first graphical element and the plurality of second graphical element have same shape.

5. The method of claim 1, wherein each of the plurality of second graphical elements is segmented into a plurality of sections indicating a plurality of antecedents forming the exception.

6. The method of claim 1, further comprising visualization of a plurality of rules and the one or more exceptions minimizes an overlap between the plurality of rules by:

identifying one or more cliques between nodes associated with the plurality of rules, and positioning the nodes accordingly.

7. A system for visualizing a rule and one or more exceptions for the rule, wherein the rule and the one or more exceptions are derived from a data set, and wherein the system comprises:

a processor;

a memory coupled to the processor, wherein the processor executes a plurality of modules stored in the memory, and wherein the plurality of modules comprises:

a receiving module to receive the rule, the one or more exceptions, and a plurality of data-attributes associated with the rule and the one or more exceptions, wherein the plurality of data-attributes comprises a list of antecedents, a list of consequents, a rule syntax, an exception syntax, a support associated with the rule, a lift, a confidence associated with the rule, a support associated with each exception of the one or more exceptions, and a confidence associated with each exception of the one or more exceptions, wherein the lift corresponds to a ratio of the confidence and the support of the consequent, wherein the rules with lift differ significantly from unit lift is considered unexpected than those with near unit lift, and wherein the support associated with the rule, the confidence associated with the rule, the support associated with each exception, and the confidence associated with each exception are statistics associated with the rule and each exception respectively; and a visualization module to visualize the rule and the one or more exceptions by:

representing the rule and the one or more exceptions with a first graphical element and a plurality of second graphical elements respectively, wherein the plurality of second graphical elements are represented within the first graphical element, and wherein the first graphical element and the plurality of second graphical elements have a plurality of visual attributes comprising a shape, a size, a transparency, a color opacity, and a color;

mapping the plurality of data-attributes with the plurality of visual attributes, wherein the color opacity of the first graphical element and the plurality of second graphical elements is mapped with the confidence associated with the rule and the confidence associated with each exception of the one or more exceptions, wherein the plurality of data-attributes are categorized as nominal and quantitative, wherein if the data-attribute is in nominal category, then the data-attribute is represented by visual attribute of color, shape and texture, wherein if the data-attribute is in quantitative category, then the data-attribute is represented by visual attribute of length, position, area, angle, and volume;

computing, by the processor, positioning of the first graphical element and the plurality of second graphical elements, wherein the size of the first graphical element and the plurality of second graphical elements are proportional to the support associated with the rule and the support associated with each exception of the one or more exceptions;

generating visualization of the rules and the support associated with each exception of the one or more exceptions based on the computed positioning, wherein the visualization generated is used for developing rule hierarchies and updating the visualization based on user interaction; and connecting at least one section of a second graphical element with at least one section of other second graphical element by an edge, wherein the at least one section of the second graphical element and the at least one section of the other second graphical element is connected based on having similar antecedents, and wherein a width of the edge represents a degree of overlap of the antecedents, wherein the one or more exceptions associated with the rules are represented using visual encoding that is used for visualizing the rules, and the visual encoding representing the exceptions are contained within the visual encoding representing the rules.

8. The system of claim 7, further comprising a color assignment module to assign the color to each section of the plurality of sections indicating the plurality of antecedents.

9. The system of claim 7, further comprising a user interface module to display the first graphical element and the plurality of second graphical element in visually distinguishing manner.

10. The system of claim 7, wherein the second graphical element and the other second graphical element belongs to the plurality of graphical elements.

11. The system of claim 7, further comprising a semantic zoom slider for providing semantic zooming from a first level of exception to subsequent levels of exceptions of the rule.

12. The system of claim 7, wherein the first graphical element and the plurality of second graphical element have same shape.

13. The system of claim 7, wherein each of the plurality of second graphical elements is segmented into a plurality of sections indicating a plurality of antecedents forming the exception.

14. The system of claim 7, wherein the visualization module during visualization of a plurality of rules and the one or more exceptions minimizes an overlap between the plurality of rules by:

identifying one or more cliques between nodes associated with the plurality of rules, and positioning the nodes accordingly.

15. A non-transitory computer readable medium embodying a program executable in a computing device for visualizing a rule and one or more exceptions for the rule, wherein the rule and the one or more exceptions are derived from a data set, the program comprising:

a program code for receiving the rule, the one or more exceptions, and a plurality of data attributes associated with the rule and the one or more exceptions, wherein the plurality of data-attributes comprises a list of antecedents, a list of consequents, a rule syntax, an exception syntax, a support associated with the rule, a lift, a confidence associated with the rule, a support associated with each exception, and a confidence associated with each exception, wherein the lift corresponds to a ratio of the confidence and the support of the consequent, wherein the rules with lift differ significantly from unit lift is considered unexpected than those with near unit lift;

a program code for visualizing the rule and the one or more exception by:

representing the rule and the one or more exceptions with a first graphical element and a plurality of second graphical elements respectively, wherein the plurality of second graphical elements are represented within the first graphical element, and wherein the first graphical element and the plurality of second graphical elements have a plurality of visual attributes comprising a shape, a size, a transparency, a color opacity; and a color;

mapping the plurality of data-attributes with the plurality of visual attributes, wherein the color opacity of the first graphical element and the plurality of second graphical elements is mapped with the confidence associated with the rule and the confidence associated with each exception of the one or more exceptions, wherein the plurality of data-attributes are categorized as nominal and quantitative, wherein if the data-attribute is in nominal category, then the data-attribute is represented by visual attribute of color, shape and texture, wherein if the data-attribute is in quantitative category, then the data-attribute is represented by visual attribute of length, position, area, angle, and volume;

computing, by the processor, positioning of the first graphical element and the plurality of second graphical elements, wherein the size of the first graphical element and the plurality of second graphical elements are proportional to the support associated with the rule and the support associated with each exception of the one or more exceptions, and wherein each of the plurality of second graphical elements is segmented into a plurality of sections indicating a plurality of antecedents forming the exception, wherein at least one section of a second graphical element and at least one section of other second graphical element have similar antecedents, and wherein the at least one section of the second graphical element and the at least one section of the other second graphical element is connected via an edge, and wherein a width of the edge represents a degree of overlap of the antecedents; and generating visualization of the rules and the support associated with each exception of the one or more exceptions based on the computed positioning, wherein the visualization generated is used for developing rule hierarchies and updating the visualization based on user interaction, wherein the one or more exceptions associated with the rules are represented using visual encoding that is used for visualizing the rules, and the visual encoding representing the exceptions are contained within the visual encoding representing the rules.

* * * * *